United States Patent
Bortnikov et al.

(10) Patent No.: US 10,049,011 B2
(45) Date of Patent: Aug. 14, 2018

(54) CONTINUING OPERATION OF A QUORUM BASED SYSTEM AFTER FAILURES

(71) Applicant: INTERNATIONAL BUSINESS MACHINES CORPORATION, Armonk, NY (US)

(72) Inventors: Vita Bortnikov, Haifa (IL); Zvi Cahana, Haifa (IL); Shlomit I. Shachor, Yokneam Eilit (IL); Ilya Shnayderman, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 15/144,950

(22) Filed: May 3, 2016

(65) Prior Publication Data
US 2017/0322848 A1 Nov. 9, 2017

(51) Int. Cl.
*G06F 11/00* (2006.01)
*G06F 11/14* (2006.01)

(52) U.S. Cl.
CPC ...... *G06F 11/142* (2013.01); *G06F 2201/805* (2013.01); *G06F 2201/85* (2013.01)

(58) Field of Classification Search
CPC .................................................. G06F 11/142
See application file for complete search history.

(56) References Cited

U.S. PATENT DOCUMENTS

| | | | | |
|---|---|---|---|---|
| 5,999,712 A * | 12/1999 | Moiin | ........... | G06F 9/5061 370/254 |
| 7,716,222 B2 | 5/2010 | Jones et al. | | |
| 7,870,230 B2 | 1/2011 | Rao et al. | | |
| 8,931,051 B2 | 1/2015 | Kumar et al. | | |
| 2003/0120715 A1* | 6/2003 | Johnson | ........... | G06F 17/30224 709/201 |
| 2010/0205273 A1* | 8/2010 | Shim | ........... | G06F 11/1425 709/210 |
| 2011/0252270 A1* | 10/2011 | Abraham | ........... | G06F 11/1425 714/4.1 |
| 2013/0191453 A1* | 7/2013 | Nishanov | ........... | G06F 9/5061 709/204 |

(Continued)

OTHER PUBLICATIONS

Maurice Herlihy. 1987. Dynamic quorum adjustment for partitioned data. ACM Trans. Database Syst. 12, 2 (Jun. 1987), 170-194 (Year: 1987).*

(Continued)

*Primary Examiner* — Jason B Bryan
(74) *Attorney, Agent, or Firm* — Teddi E. Maranzano

(57) ABSTRACT

A processor-implemented method, for continuing operation of a quorum based system is provided. The method detects a loss of quorum. A plurality of speculative configurations is created, whereby each speculative configuration is isolated from other speculative configurations in the quorum based system. Each speculative configuration continues to order requests during the creation of speculative configurations. The method selects and starts one of the plurality of speculative configurations as a new operational configuration. Ordered requests continue to the new operational configuration. The original configuration of the quorum based system is restarted in response to the plurality of speculative configurations not being isolated.

17 Claims, 5 Drawing Sheets

(56) References Cited

U.S. PATENT DOCUMENTS

| | | | | |
|---|---|---|---|---|
| 2015/0081805 | A1* | 3/2015 | Bruce | G06F 9/5061 |
| | | | | 709/206 |
| 2016/0036924 | A1* | 2/2016 | Koppolu | H04L 67/16 |
| | | | | 709/224 |

OTHER PUBLICATIONS

Savill, "Dynamic Quorum in Windows Server 2012", Jun. 17, 2013, http://windowsitpro.com/windows-server-2012/dynamic-quorum-windows-server-2012, 5 pages.

Bortnikov et al., "FRAPPE: Fast Replication Platform for Elastic Services", Aug. 1, 2011, IBM Research, Technion, Israel Institute of Technology, 6 pages.

\* cited by examiner

CONTINUING OPERATION OF A QUORUM BASED SYSTEM AFTER FAILURES

BACKGROUND

This disclosure relates generally to the field of computer synchronization, and more particularly to continuing operation of a quorum based system after failures.

A distributed computing system uses software to coordinate tasks that are performed on multiple computers simultaneously. The computers interact over a network and send each other messages to ensure they can communicate. When the network becomes partitioned, or when a computer fails, some or all of the computers no longer can communicate and become isolated. Processes running in the different network partitions may continue to operate separately, thereby producing inconsistent results.

The configuration of a distributed computing system includes the number of processes, replicas, or computers that must maintain communications, referred to as a quorum. The quorum represents the number of participants required to agree on a result before it can be applied to all the participants. This ensures that only the network partition that has a quorum will be able to continue to process requests. The remaining processes cannot form a quorum and thus will not be able to continue processing requests. With lack of quorum, the distributed system becomes non-operational until quorum is restored. However, a prompt restart of failing processes is not always possible, especially if the processes failed due to a hardware problem. Thus, a quorum based system may be non-operational for an extended period of time.

Allowing quorum based systems to remain operational may enhance availability while quorum is recovered.

SUMMARY

According to one embodiment a processor-implemented method for continuing operation of a quorum based system is provided. The method includes detecting a loss of quorum. The method provides creating a plurality of speculative configurations, whereby each speculative configuration is isolated from other speculative configurations in the quorum based system. Each speculative configuration continues to order requests during the creation of speculative configurations. The method provides selecting and starting one of the plurality of speculative configurations as a new operational configuration. Ordered requests continue to the new operational configuration. An original configuration of the quorum based system restarts, in response to the plurality of speculative configurations not being isolated.

According to another embodiment, a computer program product for continuing operation of a quorum based system is provided. The computer program product includes a plurality of agents embodied on a computer readable storage medium. The plurality of agents include program instructions executable by a processor detect a loss of quorum. The computer program product includes program instructions to create a plurality of speculative configurations, wherein each speculative configuration is isolated from other speculative configurations in the quorum based system. Each speculative configuration continues to order requests during the creation of speculative configurations. The computer program product includes program instructions to select and start one of the plurality of speculative configurations as a new operational configuration. Ordered requests continue to the new operational configuration. The computer program product includes program instructions to restart an original configuration of the quorum based system, in response to the plurality of speculative configurations not being isolated.

According to another embodiment, a computer system for continuing operation of a quorum based system is provided. The computer system includes one or more processors, one or more computer-readable storage devices, and a plurality of program instructions stored on at least one of the one or more storage devices for execution by at least one of the one or more processors. The plurality of program instructions include instructions to detect a loss of quorum. Each speculative configuration continues to order requests during the creation of speculative configurations. The computer program product includes program instructions to select and start one of the plurality of speculative configurations as a new operational configuration. Ordered requests continue to the new operational configuration. The program instructions restart an original configuration of the quorum based system, in response to the plurality of speculative configurations not being isolated.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present invention relate generally to the field of computer synchronization, and more particularly to continuing operation of a quorum based system after failures. In response to loss of quorum in a distributed computing system, multiple speculative configurations may be created, based on which nodes can communicate with each other. In each of the speculative configurations, incoming requests may be speculatively ordered, i.e., work requests may continue to be processed, even though the new operational configuration is uncertain. This contrasts with current practice, where in response to loss of quorum the distributed computing system either stopped processing or only continued operating for a limited number of commands.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
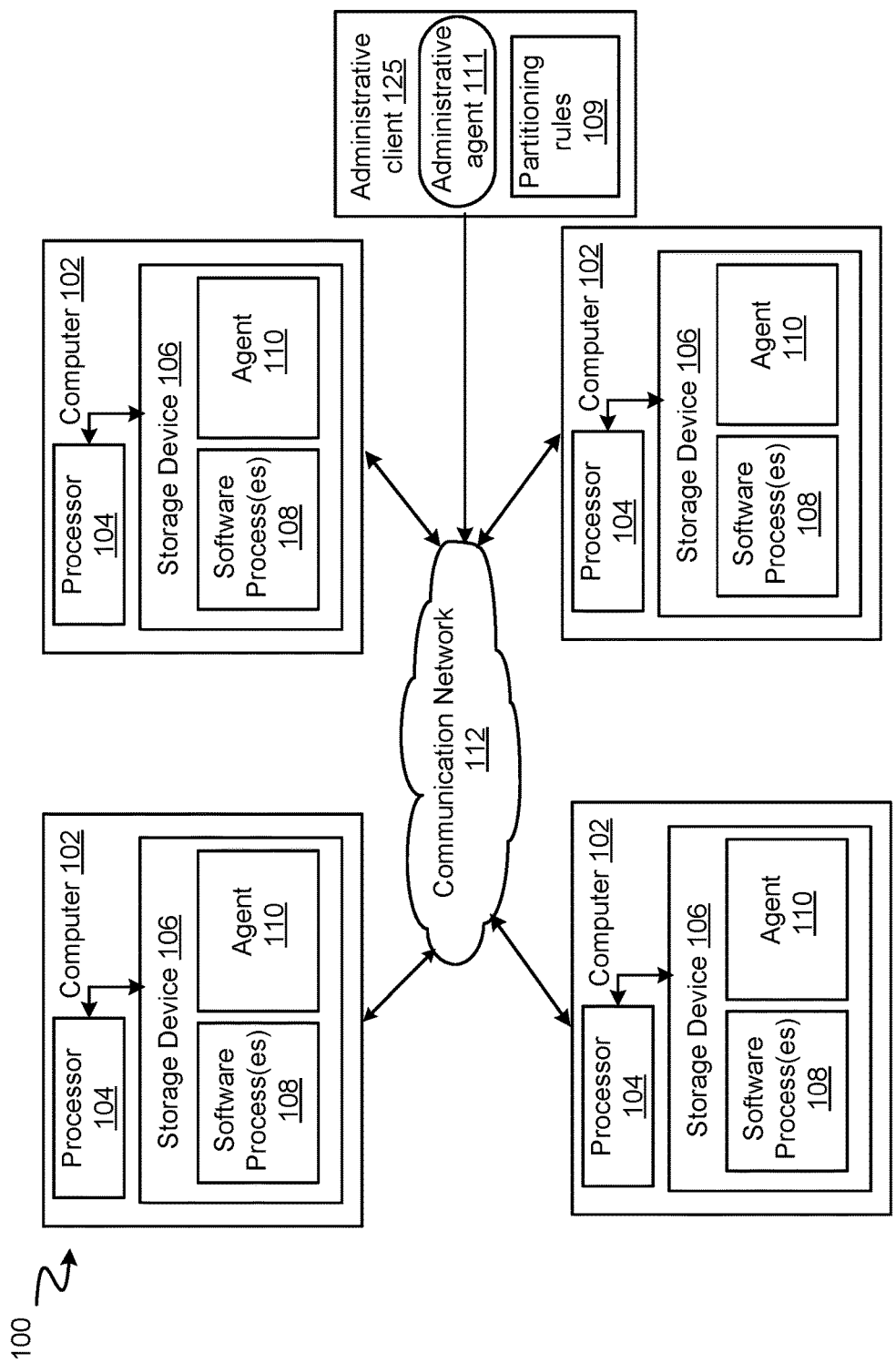
FIG. 1 illustrates an exemplary computer system environment operable for various embodiments of the disclosure.

FIG. 1 illustrates a block diagram of an exemplary distributed computing system 100 operable for various embodiments of the disclosure. The distributed computing system 100 includes several computers 102 connected through a communication network 112. In this context, types of distributed computing systems include, but are not limited to, clustered file systems, high availability clusters, distributed database management systems, and grid systems.

The computer 102 includes a processor 104 that executes instructions for software, for example the software process 108. The processor 104 may be a set of one or more processors or may be a multi-processor core, depending on the particular implementation. The software process 108 includes processes belonging to software applications, as well as daemons and other software processes that constitute control software. Software processes 108 may be grouped by application, control software, or other logical entity, whereby the members of each group cooperate with each other to perform a function. Exemplary control software includes, but is not limited to, an operating system, cluster management software, high availability software and a database management system. The software process 108 may include a partitioning agent 110 that periodically communicates with the partitioning agents 110 on the other computers 102 in the distributed computing system 100 to indicate that quorum exists, the computers 102 are operating normally, and the computers 102 are available perform work requests. The partitioning agents 110 may also communicate status and availability to the administrative agent 111. The partitioning rules 109 may control the actions of the partitioning agents 110 and the administrative agent 111, including, but not limited to, the frequency of contact among the partitioning agents 110, an amount of time an agent's communication may remain unanswered before detecting a loss of quorum, and an action to take when loss of quorum is detected. The partitioning rules 109 may define which applications or groups of processes are executing in the distributed computing system 100, and specify a separate quorum and/or a separate action for each application or group of processes. For example, there may be five computers 102 in a distributed computing system 100. One application may specify a quorum that requires processes to remain active on all five computers. However, another application's quorum may only require active processes on three of the five computers. In an embodiment, the partitioning rules 109 may assign a priority to an application or group of processes. In response to lack of quorum a new operational configuration may be selected based on priority, such as selecting the speculative configuration having the highest priority.

The storage device 106 may be any device or hardware that is capable of storing information and program instructions. The storage device 106 may take various forms depending on the particular implementation. Examples include disk storage, a flash memory, optical disk, magnetic tape, cloud storage devices, or some combination of the above.

The distributed computing system 100 may include an administrative client 125 that manages the operation of the distributed computing system 100, such as the applications, operating systems, or hardware. The administrative client 125 may additionally act as a central control point for modifying the configuration of the distributed computing system 100 when one or more partitioning agent 110 reports loss of quorum. After receiving status communications from the partitioning agents 110 that quorum is lost for one or more applications or groups of processes defined in the partitioning rules 109, the administrative agent 111 notifies an administrator, for example, by e-mail, text message, or other immediate alert mechanism. As shown, the partitioning rules 109 are centrally located on the administrative client 125, but the computers 102 may each contain a copy.

As will be discussed with reference to FIG. 5, the computer 102 may include internal components 800 and external components 900.

Figure 2:
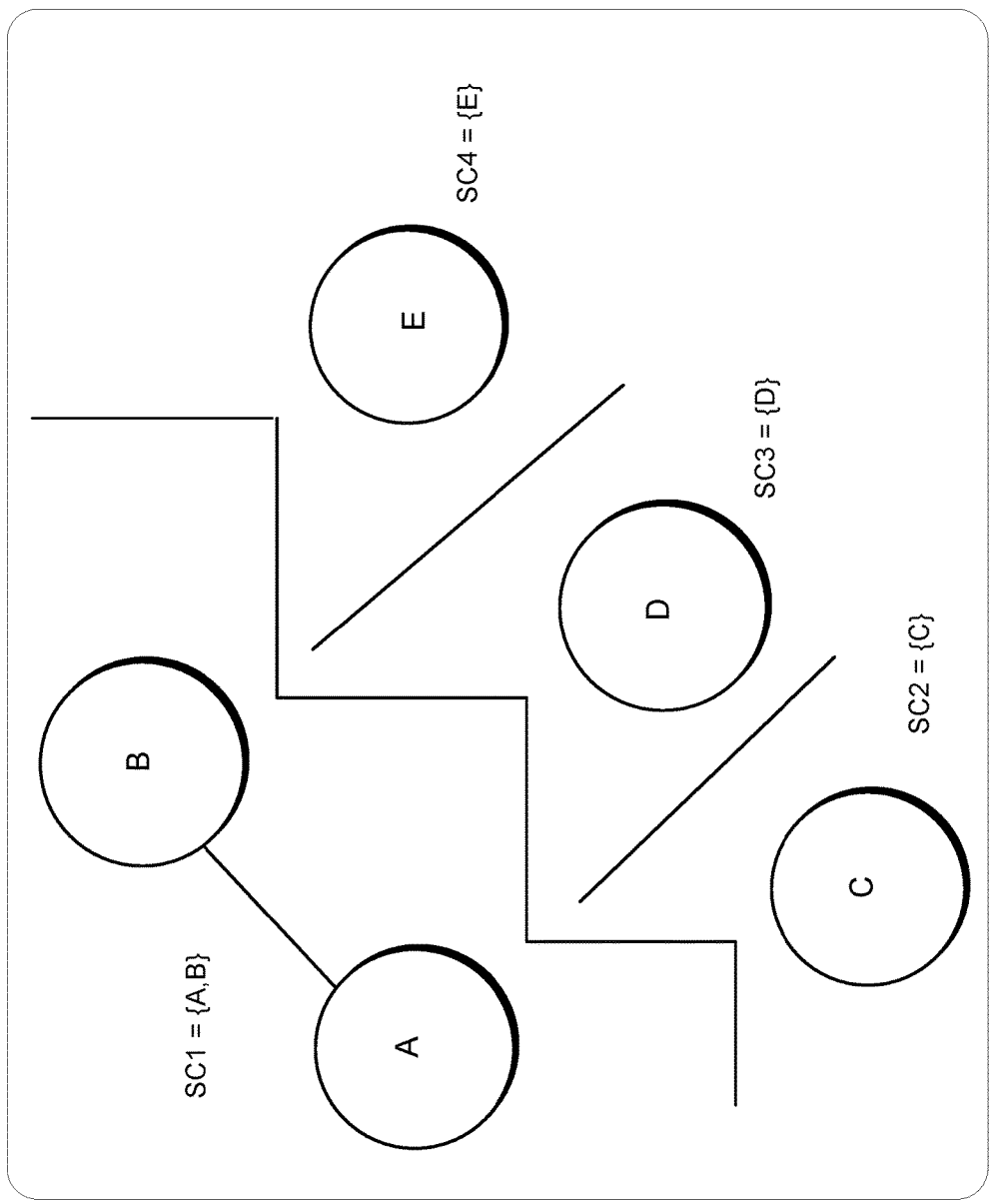
FIG. 2 illustrates an exemplary partitioned system, according to various embodiments of the disclosure.

FIG. 2 shows a distributed computing system that has become partitioned because it has lost the required quorum needed to continue operation, for example, due to a network failure or a hardware failure. FIG. 2 assumes five processes, each on a separate computer 102, and further assumes the quorum is three processes. Each of the processes may represent an agent, for example, in a high availability cluster or a replica of a clustered file system. The original configuration includes processes A, B, C, D, and E. Each process is aware of the computer 102 on which it resides, the process identifiers of processes in the group, and the identity of the operational configuration to which the group belongs on the distributed computing system 100.

A configuration file defines the configuration of an application, control software, or process. This configuration file is specific to the application, such as the operating system or database management system, and distinct from the partitioning rules 109. When a process discovers that it is partitioned from a quorum, i.e., isolated, the process examines its configuration file to identify which processes are still in communication. The process automatically creates a speculative configuration, based on which processes remain in communication. More than one speculative configuration may result, depending on the nature of the quorum loss, e.g., network failure, software process failure, or server hardware failure. In each of the speculative configurations, incoming requests may be speculatively ordered, i.e., work requests may continue to be processed, even though the new operational configuration is uncertain.

In an embodiment, the partitioning agent 110 and/or administrative agent 111 may perform the function of identifying the processes still in communication and speculative configuration creation, using the partitioning rules 109. In an embodiment, the process with lowest process identifier, here process A, raises a new speculative configuration that contains only the processes with which A can communicate, i.e., SC1={A,B}. More than one speculative configuration may be raised during partitioning, for example, SC1, SC2, SC3, and SC4. Each speculative configuration may be isolated from the other speculative configurations. As shown, C, D and E are also active, but cannot communicate with any of the other processes. Therefore, each of the other processes, C, D and E, each raise a separate speculative configuration which includes only itself: SC2={C}, SC3={D}, and SC4={E}.

However, it may occur that not all of the speculative configurations are isolated. A node may have a non-symmetric view of the distributed computing system 100. This may occur due to non-transitive communication links. For example, process A may communicate with process B, but process B determines that it is isolated from process A. In that case, A still raises speculative configuration SC1={A, B}, but B will raise SC5={B}. In that case, a speculative configuration having at least one node that can properly communicate with a majority of the other nodes may be manually selected as the new operational configuration.

Figure 3:
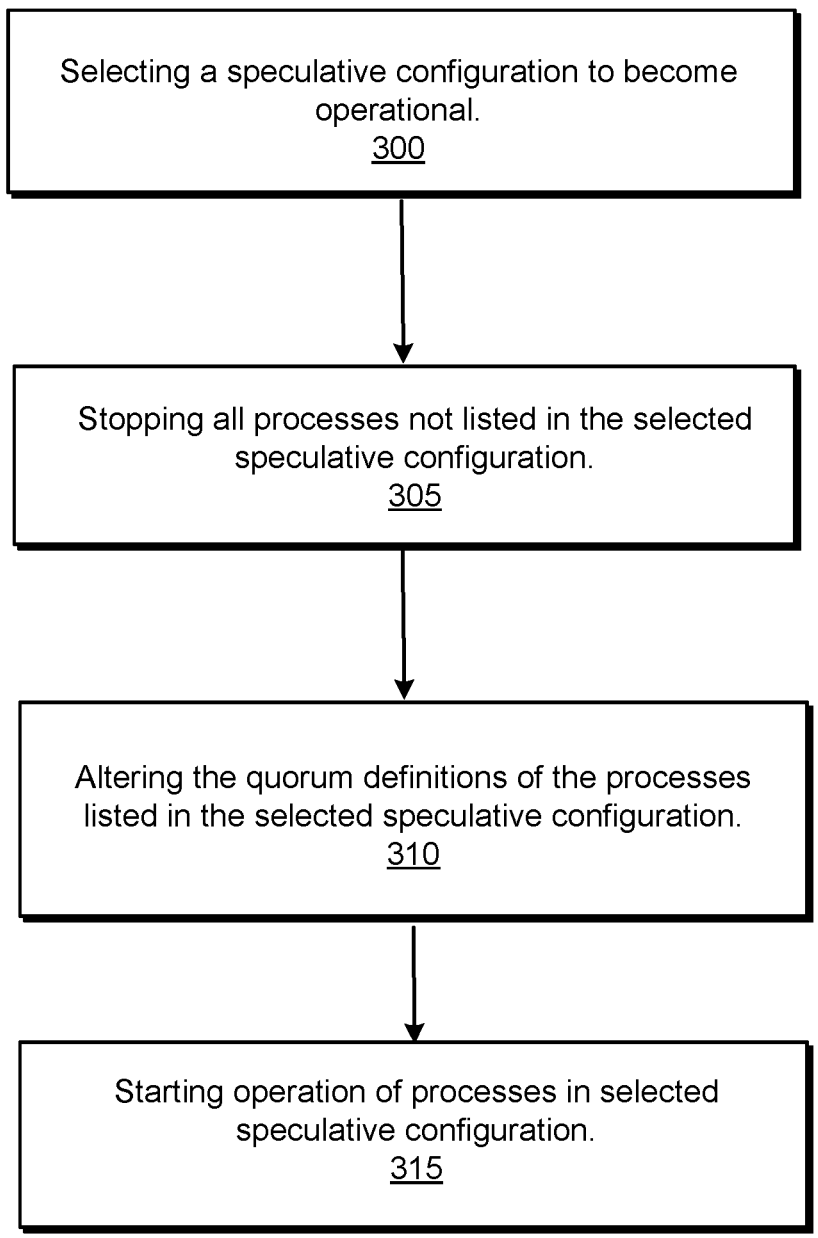
FIG. 3 illustrates an algorithm for continuing operation of a quorum based system after failures, according to various embodiments of the disclosure.

FIG. 3 illustrates an algorithm for continuing operation of a quorum based system after failures, according to various embodiments of the disclosure. At 300, the administrative agent 111 may select one of the automatically created speculative configurations, based on the plurality of partitioning rules 109. For example, a partitioning rule 109 may specify that the speculative configuration having the most processes, here SC1, should become the new operational configuration. The new operational configuration may also be selected based on a rule that ranks the applications or groups of processes by priority in the partitioning rules 109. Alternatively, an administrator may manually select the new operational configuration from a display of available speculative configurations.

Next, at 305 processes C, D, E are stopped because they are not listed in the selected new operational configuration. At 310, alter the quorum definitions for the processes listed in SC1 to set SC1 as the new operational configuration. As a result, processes A and B are removed from the original configuration and added to the new operational configuration SC1. SC1 contains only the processes with which A can communicate. Thus, the live processes form a quorum. At 315, the processes in the new operational configuration begin operating (i.e., processing transactions, or other work), since SC1 is no longer speculative, but fully operational.

Figure 4:
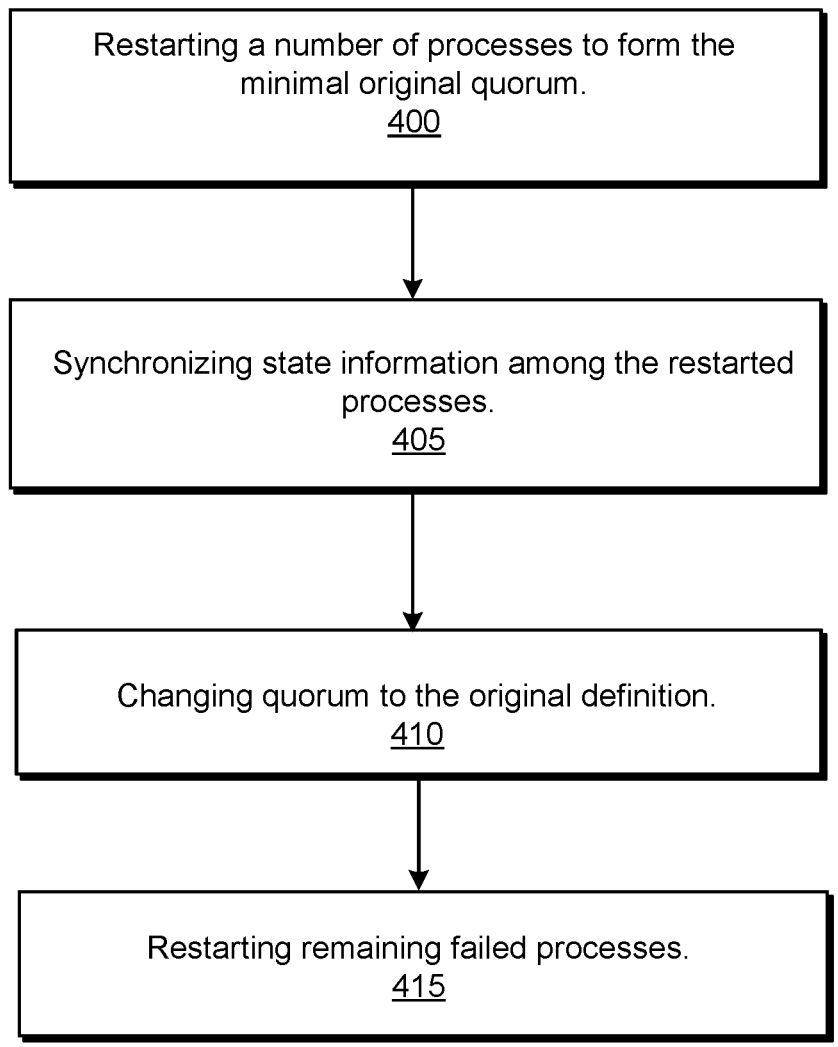
FIG. 4 illustrates an algorithm for restoring the original operational configuration of a quorum based system, according to various embodiments of the disclosure.

FIG. 4 illustrates an algorithm for restoring and restarting the original configuration, i.e., the operational configuration, of a quorum based system, according to various embodiments of the disclosure.

To restore to the configuration that was operational prior to loss of quorum, at 400 restart a minimum number of processes such that the live processes form the original quorum. The original quorum includes the processes in the new operational configuration, in this example SC1, and the restarted processes. In the example of FIG. 2, the administrator may start either C, D or E. Starting any one of them results in the original quorum of three processes.

At 405, the processes in SC1 automatically synchronize state information with the restarted process, for example C. State information transferred from the processes in SC1 to restarted process C includes notifying C that it no longer belongs to configuration {A, B, C, D, E} but now belongs to SC1 which is currently the active configuration.

At 410, once state information is synchronized within the updated SC1 configuration, the quorum can be changed back to that of the original configuration {A, B, C, D, E}.

At 415, the remaining failed processes of {A, B, C, D, E} can restart and re-integrate into the configuration. D and E still are configured to original configuration {A, B, C, D, E}. Since neither D nor E, alone or together, can form a quorum in the original configuration, they can safely restart. Since SC1 now includes D and E (from step 410), D and E will automatically receive state information from SC1. The history of the configuration changes may be included in the received state information, i.e., from {A,B,C,D,E} to SC1 {A,B} and back to {A,B,C,D,E}.

The algorithms of FIGS. 3 and 4 may be performed with or without the administrator manually intervening. For example, when selecting a speculative configuration (300 of FIG. 3), the administrator may select from a display of available speculative configurations created by the administrative agent 111 when loss of quorum was detected. Upon selection of the speculative configuration, software programs or interpretive language scripts, such as the partitioning agents 110 and the administrative agent 111 may execute the remaining steps of the algorithm of FIG. 3. Similarly, to restore the configuration that was operational prior to loss of quorum, the administrator may select a configuration from a display of previously created configurations that may include {A,B,C,D,E}. Similarly, software programs or interpretive language scripts, such as the partitioning agents and the administrative agent 111 may execute the remaining steps of the algorithm of FIG. 4.

Figure 5:
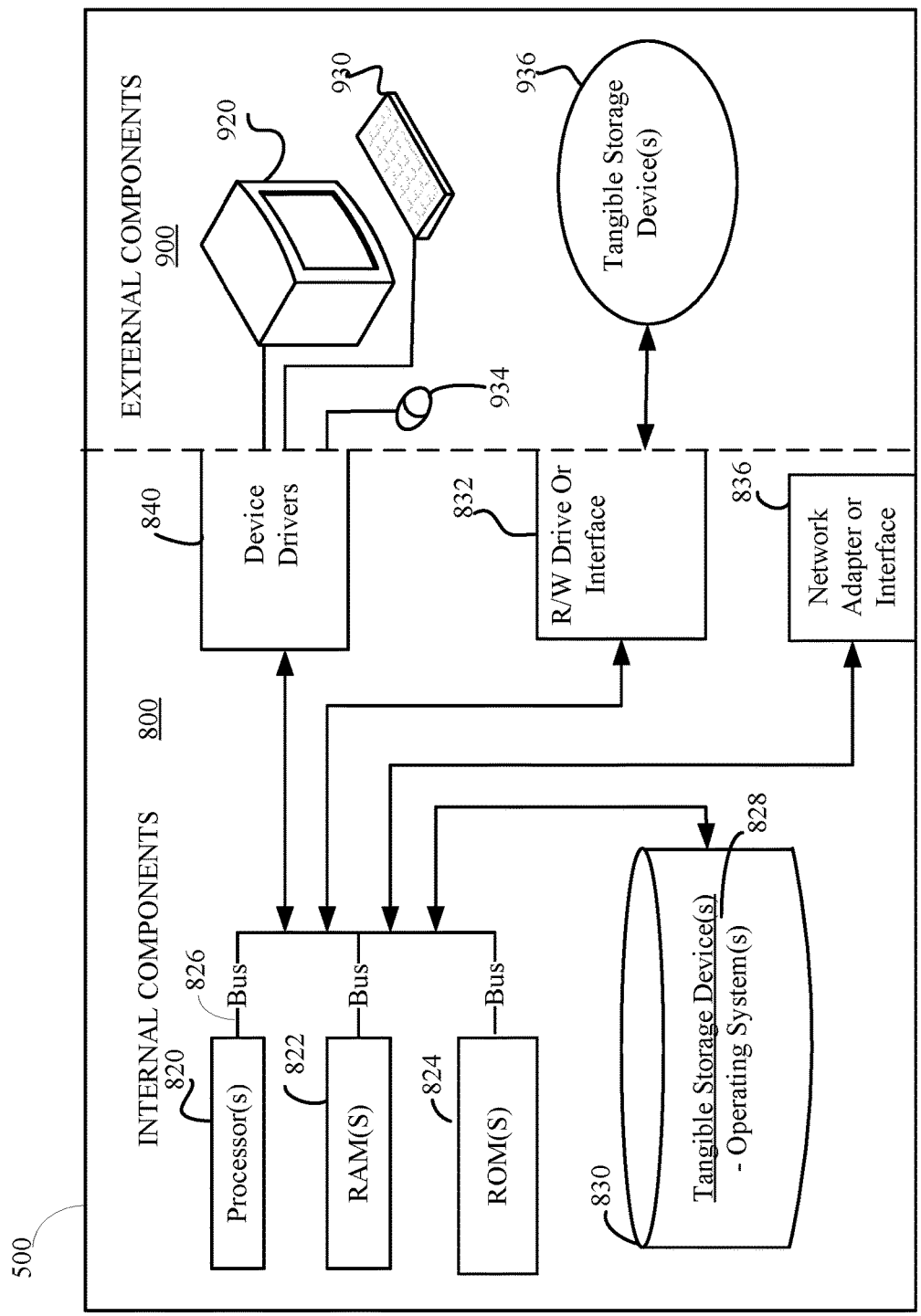
FIG. 5 is a schematic block diagram of hardware and software of the computer environment according to an embodiment of the processes of FIGS. 3 and 4.

FIG. 5 illustrates an exemplary computing device 500 applicable for executing the algorithms of FIGS. 3-4. Computing device 300 may include respective sets of internal components 800 and external components 900 that together may provide an environment for a software application, such as the data replication recoverer. Each of the sets of internal components 800 includes one or more processors 820; one or more computer-readable RAMs 822; one or more computer-readable ROMs 824 on one or more buses 826; one or more operating systems 828; one or more software applications executing the method illustrated in FIGS. 3-4; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 500, can be downloaded to computing device 500 from an external computer (e.g., server) via a network (for example, the Internet, a local area network, or other wide area network) and respective network adapters or interfaces 836. From the network adapters (or switch port adapters) or interfaces 836 and operating system 828 associated with computing device 500 are loaded into the respective tangible storage device 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A processor-implemented method for continuing operation of a quorum based system comprising:
   detecting partitioning of the quorum based system as a result of a loss of quorum after one or more of a network failure, a software process failure, and a server hardware failure;
   creating a plurality of speculative configurations of one or more functioning nodes of the quorum based system in response to the detected partitioning, wherein each speculative configuration is isolated from other speculative configurations in the quorum based system, and wherein each speculative configuration continues to order requests while the plurality of speculative configurations is created;
   selecting and starting one of the plurality of speculative configurations as a new operational configuration, wherein the ordered requests are added to the new operational configuration; and
   restarting an original configuration of the quorum based system, in response to the plurality of speculative configurations not being isolated, wherein restarting the original configuration comprises:
      restarting a number of processes, wherein the number of processes is a minimum quorum of the original configuration;
      synchronizing state information among the restarted number of processes, wherein the state information includes notifying the restarted number of processes that the original configuration is no longer active;
      altering quorum definitions of the restarted number of processes and the processes in the new operational configuration to the original configuration; and
      restarting and integrating any remaining failed processes into the original configuration.

2. The method of claim 1, wherein the starting further comprises:
   selecting the new operational configuration from the plurality of speculative configurations;
   stopping all processes belonging to the original configuration of the quorum based system but not listed in the new operational configuration; and
   altering quorum definitions of all of the processes belonging to the original configuration listed in the new operational configuration, wherein all of the processes belonging to the original configuration are removed from the original configuration and added to the new operational configuration.

3. The method of claim 1, wherein the configurations of the plurality of speculative configurations are automatically created based on a plurality of partitioning rules.

4. The method of claim 3, wherein based on one of the plurality of partitioning rules, the speculative configuration having a most processes is the new operational configuration.

5. The method of claim 3, wherein based on one of the plurality of partitioning rules, the new operational configuration is the speculative configuration having a highest priority.

6. The method of claim 3, wherein the new operational configuration is selected based on the plurality of partitioning rules, or is manually selected from a display of available speculative configurations.

7. A computer program product for continuing operation of a quorum based system comprising:
   a plurality of agents embodied on a computer readable storage medium, the plurality of agents including program instructions executable by a processor, the program instructions comprising:
      program instructions to detect partitioning of the quorum based system as a result of a loss of quorum after one or more of a network failure, a software process failure, and a server hardware failure;
      program instructions to create a plurality of speculative configurations of one or more functioning nodes of the quorum based system in response to the detected partitioning, wherein each speculative configuration is isolated from other speculative configurations in the quorum based system, and wherein each speculative configuration continues to order requests while the plurality of speculative configurations is created;
      program instructions to select and start one of the plurality of speculative configurations as a new operational configuration, wherein the ordered requests are added to the new operational configuration; and
      program instructions to restart an original configuration of the quorum based system, in response to the plurality of speculative configurations not being isolated, wherein the program instructions to restart the original configuration comprise:
         program instructions to restart a number of processes, wherein the number of processes is a minimum quorum of the original configuration;
         program instructions to synchronize state information among the restarted number of processes, wherein the state information includes notifying the restarted number of processes that the original configuration is no longer active;

program instructions to alter quorum definitions of the restarted number of processes and the processes in the new operational configuration to the original configuration; and program instructions to restart and integrating any remaining failed processes into the original configuration.

8. The computer program product of claim 7, wherein the program instructions to start further comprise:

program instructions to select the new operational configuration from the plurality of speculative configurations;

program instructions to stop all processes belonging to the original configuration of the quorum based system but not listed in the new operational configuration; and program instructions to alter quorum definitions of all of the processes belonging to the original configuration listed in the new operational configuration, wherein all of the processes belonging to the original configuration are removed from the original configuration and added to the new operational configuration.

9. The computer program product of claim 7, wherein the configurations of the plurality of speculative configurations are automatically created based on a plurality of partitioning rules.

10. The computer program product of claim 9, wherein based on one of the plurality of partitioning rules, the speculative configuration having a most processes is the new operational configuration.

11. The computer program product of claim 9, wherein based on one of the plurality of partitioning rules, the new operational configuration is the speculative configuration having a highest priority.

12. A computer system for continuing operation of a quorum based system comprising:

one or more processors, one or more computer-readable storage devices, and a plurality of program instructions stored on at least one of the one or more storage devices for execution by at least one of the one or more processors, the plurality of program instructions comprising:

program instructions to detect partitioning of the quorum based system as a result of a loss of quorum after one or more of a network failure, a software process failure, and a server hardware failure;

program instructions to create a plurality of speculative configurations of one or more functioning nodes of the quorum based system in response to the detected partitioning, wherein each speculative configuration is isolated from other speculative configurations in the quorum based system, and wherein each speculative configuration continues to order requests while the plurality of speculative configurations is created;

program instructions to select and start one of the plurality of speculative configurations as a new operational configuration, wherein the ordered requests continue to the new operational configuration; and program instructions to restart an original configuration of the quorum based system, in response to the plurality of speculative configurations not being isolated, wherein the program instructions to restart comprise:

program instructions to restart a number of processes, wherein the number of processes is a minimum quorum of the original configuration;

program instructions to synchronize state information among the restarted number of processes, wherein the state information includes notifying the restarted number of processes that the original configuration is no longer active;

program instructions to alter quorum definitions of the restarted number of processes and the processes in the new operational configuration to the original configuration; and program instructions to restart and integrate any remaining failed processes into the original configuration.

13. The computer system of claim 12, wherein the program instructions to start further comprise:

program instructions to select the new operational configuration from the plurality of speculative configurations;

program instructions to stop all processes belonging to the original configuration of the quorum based system but not listed in the new operational configuration; and program instructions to alter quorum definitions of all of the processes belonging to the original configuration listed in the new operational configuration, wherein all of the processes belonging to the original configuration are removed from the original configuration and added to the new operational configuration.

14. The computer system of claim 12, wherein the configurations of the plurality of speculative configurations are automatically created based on a plurality of partitioning rules.

15. The computer system of claim 14, wherein based on one of the plurality of partitioning rules, the speculative configuration having a most processes is the new operational configuration.

16. The computer system of claim 14, wherein based on one of the plurality of partitioning rules, the new operational configuration is the speculative configuration having a highest priority.

17. The computer system of claim 14, wherein the new operational configuration is selected based on the plurality of partitioning rules, or is manually selected from a display of available speculative configurations.

* * * * *